United States Patent
Javalkar

(10) Patent No.: US 8,768,884 B2
(45) Date of Patent: *Jul. 1, 2014

(54) SYNCHRONIZATION OF DISSIMILAR DATABASES

(75) Inventor: Shirish S. Javalkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,146

(22) Filed: Aug. 22, 2012

(65) Prior Publication Data

US 2013/0041870 A1    Feb. 14, 2013

Related U.S. Application Data

(63) Continuation of application No. 11/669,655, filed on Jan. 31, 2007, now Pat. No. 8,332,353.

(51) Int. Cl.
*G06F 17/30* (2006.01)

(52) U.S. Cl.
CPC .... *G06F 17/30371* (2013.01); *G06F 17/30377* (2013.01); *G06F 17/30575* (2013.01)
USPC ........... 707/611; 707/622; 707/635; 707/655; 707/678

(58) Field of Classification Search
CPC .................... G06F 17/30575; G06F 17/30351; G06F 17/30371; G06F 17/30359; G06F 17/30377; G06F 17/30578
USPC ......... 707/611, 622, 635, 655, 678, 200, 201, 707/203, 204
See application file for complete search history.

(56) References Cited

U.S. PATENT DOCUMENTS

| | | | | |
|---|---|---|---|---|
| 7,313,575 | B2 * | 12/2007 | Carr et al. | 707/999.101 |
| 7,366,460 | B2 * | 4/2008 | O'Farrell et al. | 455/3.06 |
| 7,469,256 | B1 * | 12/2008 | Manolov et al. | 707/999.102 |
| 7,668,878 | B2 * | 2/2010 | Arora et al. | 707/610 |
| 7,912,858 | B2 * | 3/2011 | Fleck et al. | 707/783 |
| 2003/0212660 | A1 * | 11/2003 | Kerwin | 707/1 |

OTHER PUBLICATIONS

Javalkar S.S, U.S. Appl. No. 11/669,655, "Synchronization of Dissimilar Databases", filed Jan. 31, 2007, Notice of Allowance dated Aug. 2, 2012.

(Continued)

*Primary Examiner* — Fred I Ehichioya
*Assistant Examiner* — Dangelino Gortayo
(74) *Attorney, Agent, or Firm* — Jinesh P. Patel; John Pivnichny; Yudell Isidore NG Russell PLLC

(57) ABSTRACT

To synchronize databases between disparate data processing environments, a buffer, which is part of a first data processing environment having a first database, is loaded with a database update. Loading the buffer does not commit the database update to the first database in the first data processing environment. A remote function is called in the first data processing environment to apply the database update to a second database in a disparate second data processing environment. In response to the remote function determining that the second database has been successfully updated with the database update, the database update is committed to the first database. In response to the remote function determining that the second database has not been successfully updated with the database update, the database update is rolled back in the buffer such that the first data processing environment is unaware of an attempted update to the first database.

17 Claims, 7 Drawing Sheets

(56) References Cited

OTHER PUBLICATIONS

Javalkar S.S, U.S. Appl. No. 11/669,655, "Synchronization of Dissimilar Databases", filed Jan. 31, 2007, Final Office Action dated May 13, 2009.

Javalkar S.S, U.S. Appl. No. 11/669,655, "Synchronization of Dissimilar Databases", filed Jan. 31, 2007, Non-Final Office Action dated Nov. 13, 2008.

* cited by examiner

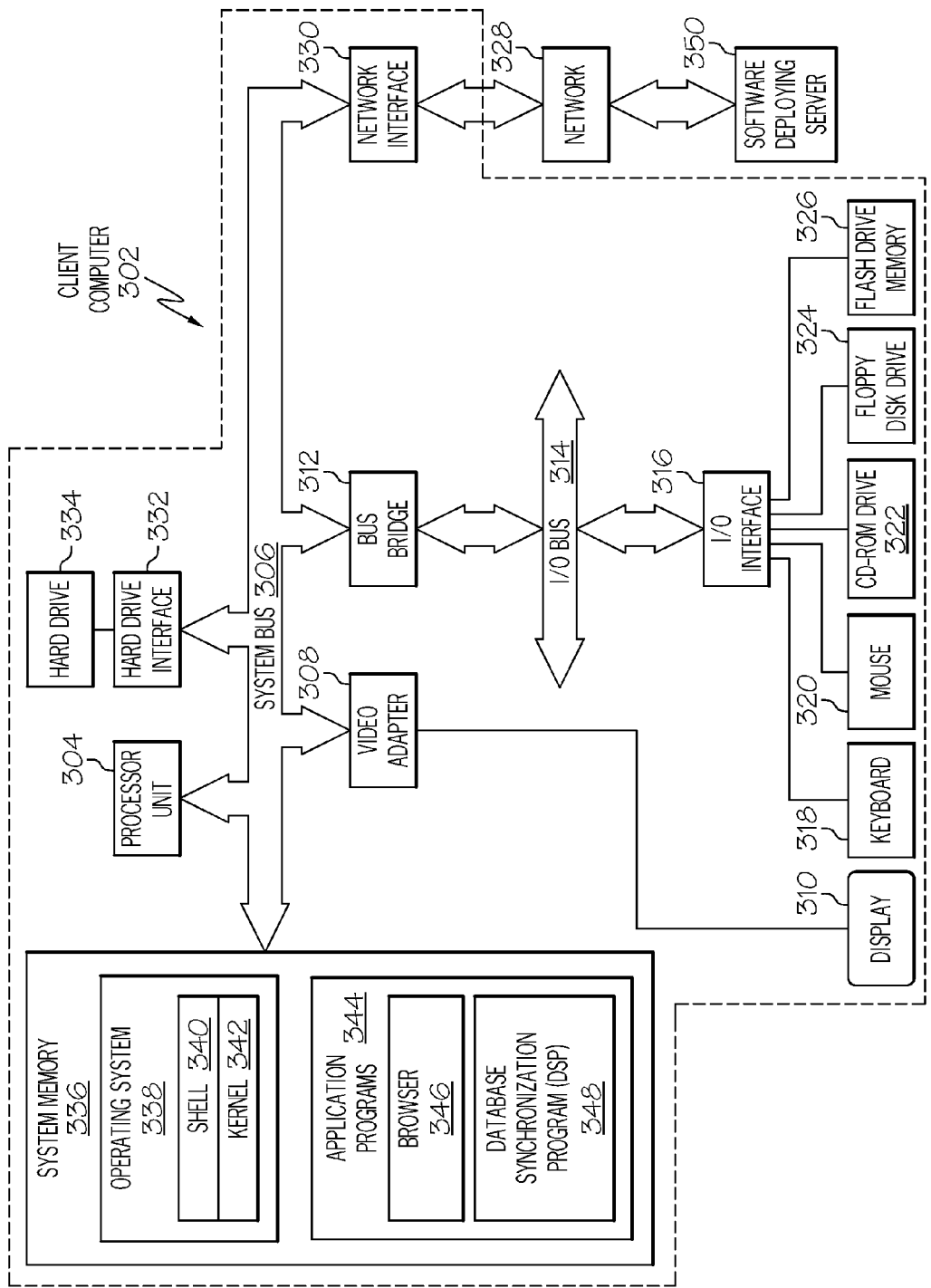

SYNCHRONIZATION OF DISSIMILAR DATABASES

The present application claims priority under 35 U.S.C. §120 as a continuation application to application Ser. No. 11/669,655, entitled "SYNCHRONIZATION OF DISSIMILAR DATABASES," filed on Jan. 31, 2007 now U.S. Pat. No. 8,332,353, which is hereby incorporated by reference in its entirety.

BACKGROUND OF THE INVENTION

1. Technical Field

The present disclosure relates in general to the field of computers, and more particularly to the use of computer software. Still more particularly, the present disclosure relates to the synchronization of dissimilar databases in different systems.

2. Description of the Related Art

From a high-level perspective, a computer can be viewed as a collection of hardware resources that, under the direction of an operating system, executes software code to manipulate data. An exemplary form of such data is a table.

Oftentimes, two disparate computer systems need to coordinate updating copies of a same table in a synchronous manner. That is, a first computer system, which utilizes a first type of software, may update a table. In response to the first computer system updating the table, a second computer system, which utilizes a second type of software, needs to update the same table, which is stored the second computer in a different format, which uses a different protocol from that found in the first system.

An example of such a need to synchronize table updating is that found with an SAP™ system and a non-SAP™ external system. SAP™ is a well known Enterprise Resource Planning (ERP) software that integrates data from an enterprise's departments such as accounting, payroll, human resources, inventory control, sales, legal, etc. SAP™ has very specific protocols, one of which is problematic. Specifically, when a SAP™ system updates a local SAP™ database table, this update can be sent to a non-SAP™ table in an external (non-SAP™) system. However, if the external system fails to update the non-SAP™ table, the SAP™ system has no way of knowing this under SAP™ protocol. Thus, if the non-SAP™ system fails to make the proper update to the non-SAP™ table, then data in the SAP™ and non-SAP™ systems are no longer synchronized.

SUMMARY OF THE INVENTION

To synchronize databases between disparate data processing environments, a buffer, which is part of a first data processing environment having a first database, is loaded with a database update. Loading the buffer does not commit the database update to the first database in the first data processing environment. A remote function is called in the first data processing environment to apply the database update to a second database that is part of a disparate second data processing environment. In response to the remote function determining that the second database has been successfully updated with the database update, the database update is committed to the first database in the first data processing environment. In response to the remote function determining that the second database has not been successfully updated with the database update, the database update is rolled back in the buffer such that the first data processing environment is unaware of an attempted update to the first database.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 illustrates an exemplary computer in which the present invention may be utilized;

DETAILED DESCRIPTION OF THE PREFERRED EMBODIMENT

Figure 1:
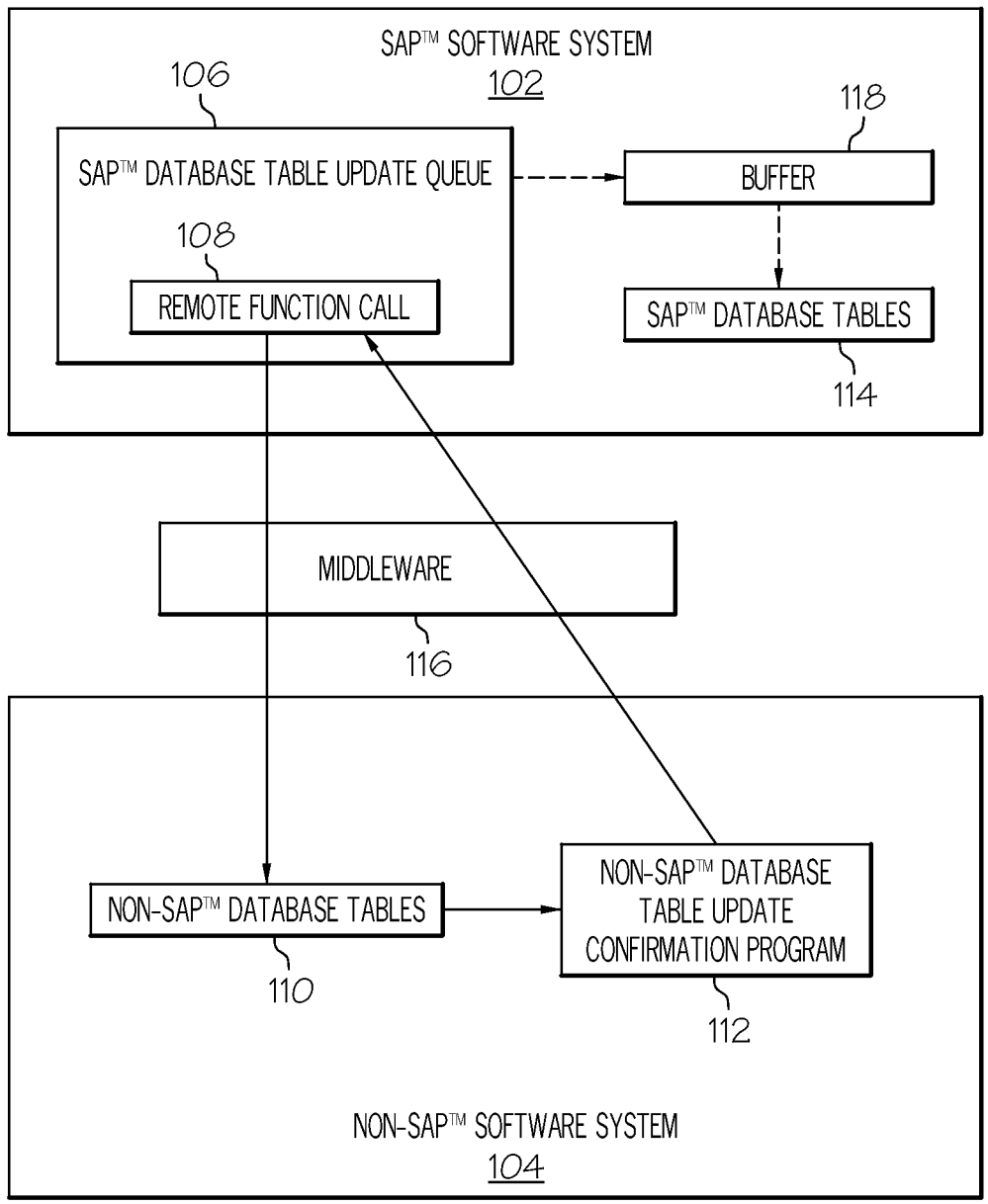
FIG. 1 depicts an interaction between an SAP™ system and a non-SAP™ system during a joint database update.

With reference now to the figures, and in particular to FIG. 1, there is depicted a software diagram of two disparate computer software systems: a SAP™ software system 102 and a non-SAP™ software system 104. In one embodiment, the SAP™ software system 102 and the non-SAP™ software system 104 operate within different hardware systems, while in another embodiment, the SAP™ software system 102 and the non-SAP™ software system 104 are simply different software partitions within a single hardware system.

Because the two software systems (SAP™ software system 102 and non-SAP™ software system 104) are disparate (e.g., they have different protocols, definitions, organization, etc.), SAP™ software system 102 is initially unable to know if a synchronization of database updates between SAP™ software system 102 and non-SAP™ software system 104 was successful. That is, assume that a database update is made to SAP™ database tables 114. In order for SAP™ software system 102 and non-SAP™ software system 104 to be synchronized, the non-SAP™ database tables 110 must also receive the same database update. However, since the SAP™ software system 102 and non-SAP™ software system 104 are disparate, the SAP™ software system 102 is unable to know if the update to the non-SAP™ database tables 110 in non-SAP™ software system 104 was successful.

To address this problem in accordance with the present novel disclosure, updates to SAP™ database tables 114 are initially pushed onto a SAP™ database table update queue 106 in SAP™ software system 102, which includes a "Remote Function Call" 108 at the end (after all updates) of the queue. Each update in the SAP™ database table update queue 106 is initially updated in a buffer 118, which holds a copy of updated data from a table, found in SAP™ database tables 114 that are to be updated. As soon as all updates are successfully made in the buffer 118, the "Remote Function Call" 108 passes the updates to the non-SAP™ database tables 110 via middleware 116. Since the "Remote Function Call" 108 is found at the end of the queue in the SAP™ database table update queue 106, the non-SAP™ software system 104 is never called unless all updates found in the SAP™ database table update queue 106 are successfully implemented and sent to buffer 118. If these updates are not all successful, then the SAP™ database tables 114 are never updated, and the non-SAP™ software system 104 is never called.

A non-SAP™ database table update confirmation program 112 monitors whether the updates to the non-SAP™ database tables 110 are successful or not. A message, which is sent from the non-SAP™ database table update confirmation program 112 to the "Remote Function Call" 108, tells the "Remote Function Call" 108 if the update to the non-SAP™ database tables 110 was successful. If it was, then the SAP™ database table update queue 106 releases the updates to the SAP™ database tables 114, either directly or, as shown in a preferred embodiment in FIG. 1, by directly copying updated tables from the buffer 118 over to the SAP™ database tables 114. However, if the update to the non-SAP™ database tables 110 was not successful, then the update changes located in the SAP™ database table update queue 106 are deleted, thus "rolling back" the updates in the SAP™ software system 102.

Note that in a preferred embodiment, middleware 116 interfaces SAP™ software system 102 with non-SAP™ software system 104. Middleware 116 passes SAP™ calls between SAP™ software system 102 and non-SAP™ software system 104 such that if non-SAP™ software system 104 does not receive a message to update the non-SAP™ database tables 110, or if non-SAP™ software system 104 is unable to update the non-SAP™ database tables 110, a BAD response is sent to the SAP™ software system 102. Similarly, if the non-SAP™ software system 104 is able to update the non-SAP™ database tables 110, then a GOOD response is sent to the SAP™ software system 102 indicating the successful updating of the non-SAP™ database tables 110.

Figure 2:
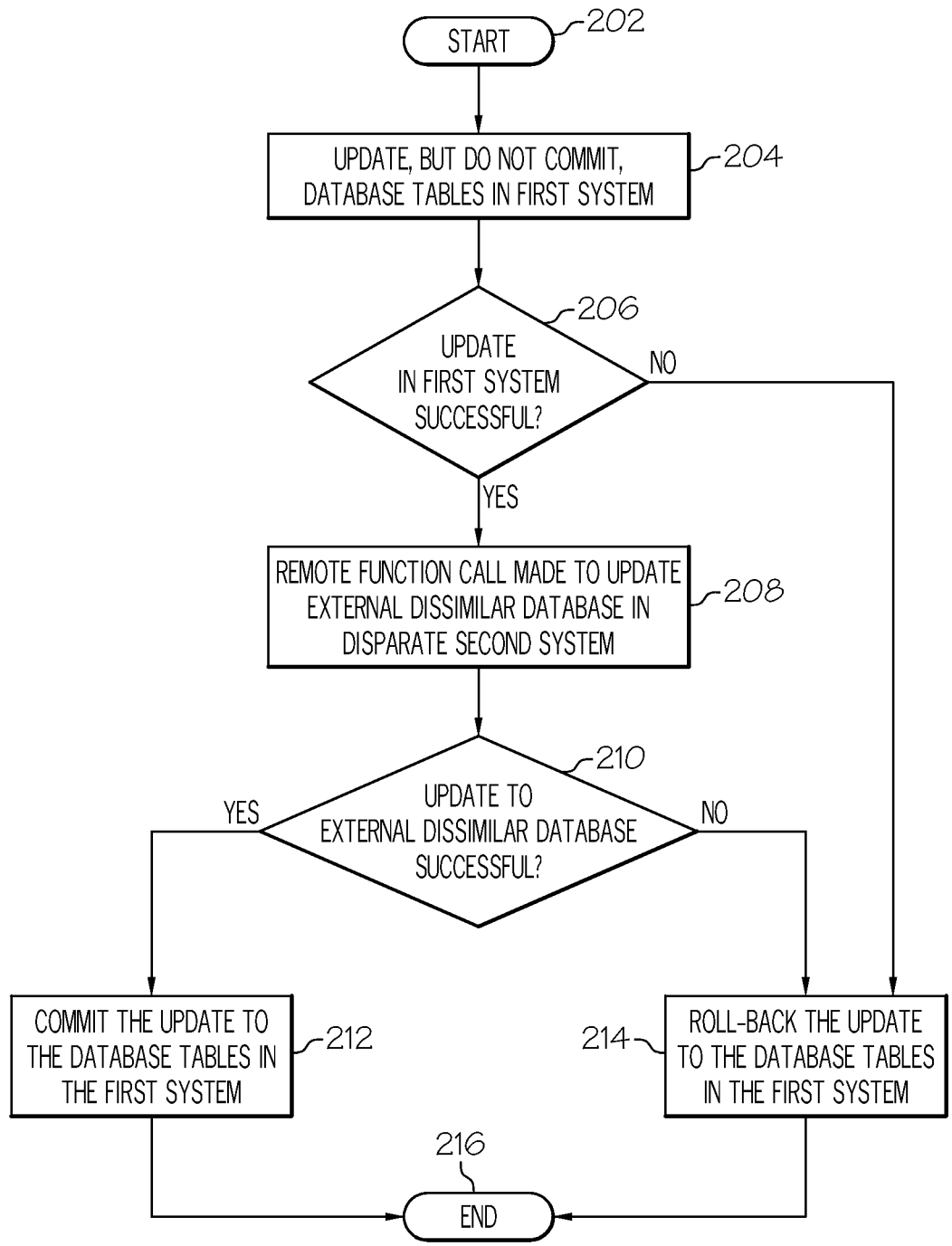
FIG. 2 is a flow-chart of exemplary steps taken to synchronize databases found in the SAP™ system and the non-SAP™ system shown in FIG. 1.

Referring now to FIG. 2, a flow-chart of exemplary steps taken to synchronize databases in disparate computer systems is presented. After initiator block 202, which may be prompted by a command to update a database in a first (hardware or software) system, the update is initiated in, but not committed to, the first system (block 204). If the update was successful in the first system (query block 206), then a "Remote Function Call" is made to the second (hardware or software) system, instructing the second system to update a corresponding but dissimilar (due to different protocol, format, etc.) database in the second system with the update (block 208). If the update to the database in the second system is successful (query block 210), then the update is committed in the first system (block 212) and the process ends (terminator block 216). However, if the update in the second system fails (query block 210), then the update in the first system is rolled back (block 214), such that the first system never sees the update in its database.

Returning to query block 206, if the update in the first system is unsuccessful, then the second system is never involved, and the update to the database in the first system never takes place (block 214), thus ending the process (terminator block 216).

Note that while the updated databases are referenced as database tables for exemplary purposes, any type of database or data file may be updated in a synchronous manner by utilizing the method described herein.

While FIG. 1 and FIG. 2 provide a high-level overview of the present disclosure, presented now are additional details of the inventive process in exemplary and narrative form for a SAP™ system.

Sales Order Create Scenario

When a sales order is created in SAP™, the sales order needs to be created simultaneously in the external (disparate) system. If the database updates in SAP™ fail, the order should not be created in the external system. Similarly if the external system fails to create the order then that order should not be created in SAP™.

Sales Order Change Scenario

When a sales order is changed in SAP™, it needs to be changed simultaneously in the external system. If the database updates in SAP™ fail, the order should not be changed in the external system. Similarly if the external system fails to make changes in the order then the changes made in the SAP™ order need to be rolled back.

Although the above description relates to orders, the method described herein relates to any object or information which is needed to be synchronized across dissimilar systems.

As described herein, a "Remote Function Call" is made, to the external dissimilar database, after all the database table updates in SAP™ are carried out but not committed. The external system responds back to SAP™ system with a return code stating if the updates are successful or not. SAP™ database updates are committed upon successful database updates in the external database. SAP™ database updates are rolled back if the database updates in the external database fail.

Following is an exemplary SAP™-based implementation of the presently disclosed method.

First, SAP™ makes all the database updates in "Update Task". Whenever processing needs to make database updates, SAP™ puts Structured Query Language (SQL) statements to update a database table into a "Function Module" that is executed in the "Update Task." As and when the "Update Task" function module, which has SQL statements to update database tables, is called, the database updates are not carried out immediately. Rather, a "Function Module" call is put in a Dynamic Update task queue. Once the normal processing is over, all of the Function modules called in "Update Task" are processed in the order of update task queuing (i.e., the first updates that are placed in the queue are processed first). If any update fails, processing of the update task of all the updates are rolled back. Alternatively, set of commands can be placed in a "Form", after the execution of "Commit Work." This can be done by performing the form "On Commit." Thus, execution of "Commit Work" ends normal processing. After the command "Commit Work" is executed, all the forms that are performed "On Commit" are executed. Thereafter, SAP™ initiates processing of function modules in "Update Task" in the order of dynamic update the task queue. All "Function Modules" in the update task are processed in a single logical unit of work. If any part of the "Function Module" fails, none of the database updates are committed to the database.

The order to update the database in the external system is created in the external system by making a real time "Remote Function Call" to the external system during the same session/Logical unit of work where order is being created/changed in SAP™. It is necessary to make sure that all the Database updates are successfully carried out in SAP™ before trying to make the "Remote Function Call" to create the order in the external system.

The "Remote Function Call" to the external system is placed in a function module that is called in update task. To ensure that the "Remote Function Call" to the external system is placed at the end of dynamic update task queue, the function module that has the "Remote Function Call," is placed in a form that is performed "On Commit Level 3". Since all of the forms that are called "on commit" are processed after the normal processing as explained earlier, and within the forms that are performed on commit, the level 3 forms are performed in the end. This ensures that the Function module that has a "Remote Function Call" to the external system is placed at the end of dynamic update task queue. If any of the SAP™ database updates fail, then this call to the external system will never be made, thus ensuring that if an order is not successfully created/changed in SAP™, it will not be created/changed in the external system. If the "Remote Function Call" is made and is successful, then the SAP™ order is saved without any update failure. As the order is created/updated successfully in the external system, both systems are in "Sync". If the order can not be created/changed in the external system due to any problems such as database update failure, then the "Remote Function Call" returns an indicator to SAP™ saying that the order was not successfully created/updated the external system. In such cases, since the "Remote Function Call" is placed in a function module that is executed in an update task, after checking the "bad" indicator indicating that the order in not successfully created/updated the external system, all of the database updates in SAP™ are rolled back by giving an express message "Message Type X". This makes sure that both SAP™ and external system are always in sync.

Thus, the above-described method causes any external database to always be kept in "Sync" with the SAP™ database in real time environment.

With reference now to FIG. 3, there is depicted a block diagram of an exemplary client computer 302, in which the present invention may be utilized. Note that some or all of the exemplary architecture shown for client computer 302 may be utilized by encryption logic 208, decryption logic 214, data center VPN server 218, database server 226 and corporate database 228 shown in FIG. 2, as well as software deploying server 350 shown in FIG. 3.

Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 350 via a network 328 using a network interface 330, which is coupled to system bus 306. Network 328 may be an external network such as the Internet, or an internal network such as an Ethernet or a Virtual Private Network (VPN). Note the software deploying server 350 may utilize a same or substantially similar architecture as client computer 302.

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 350.

Application programs 344 in client computer 302's system memory (as well as software deploying server 350's system memory) also include a Database Synchronization Program (DSP) 348. DSP 348 includes code for implementing the processes described in FIGS. 1-2. In one embodiment, client computer 302 is able to download DSP 348 from software deploying server 350.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 350 performs all of the functions associated with the present invention (including execution of DSP 348), thus freeing client computer 302 from having to use its own internal computing resources to execute DSP 348.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of DSP 348, are performed by service provider server 350. Alternatively, DSP 348 and the method described herein, and in particular as shown and described in FIGS. 1-2, can be deployed as a process software from service provider server 350 to client computer 302. Still more particularly, process software for the method so described may be deployed to service provider server 350 by another service provider server (not shown).

Figure 4A:
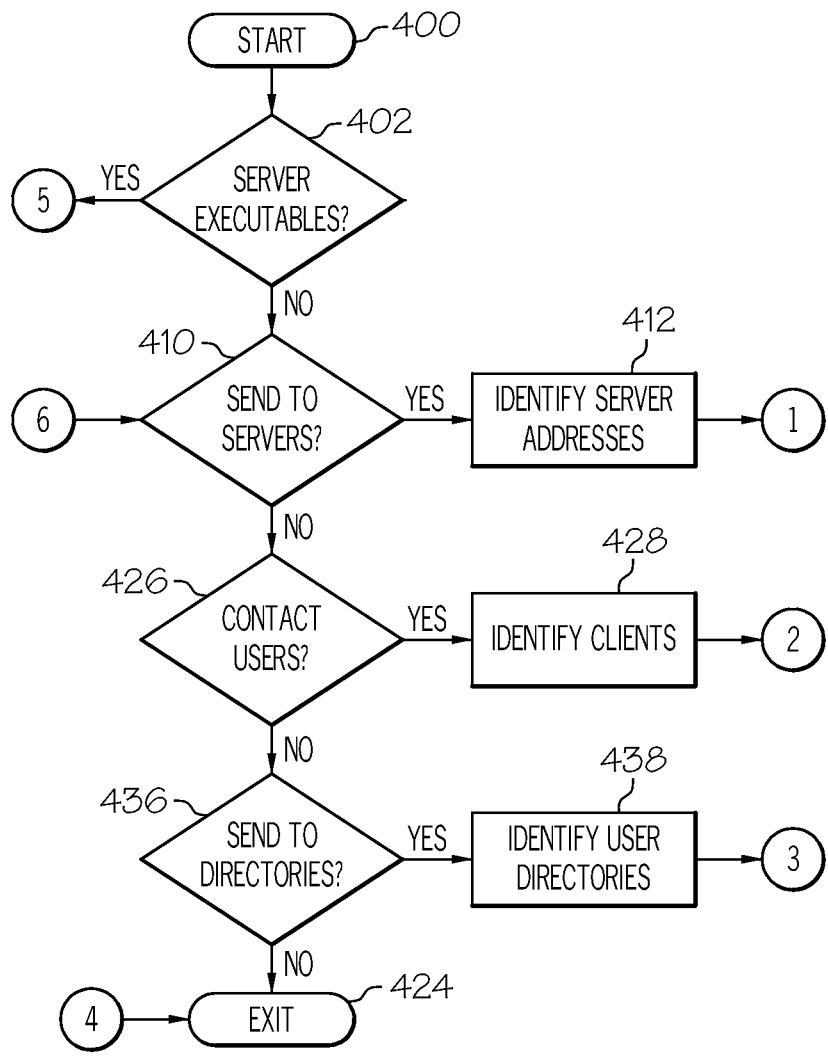
FIGS. 4A-B are flow-charts showing steps taken to deploy software capable of executing the steps described in FIGS. 1-2.
Figure 4B:
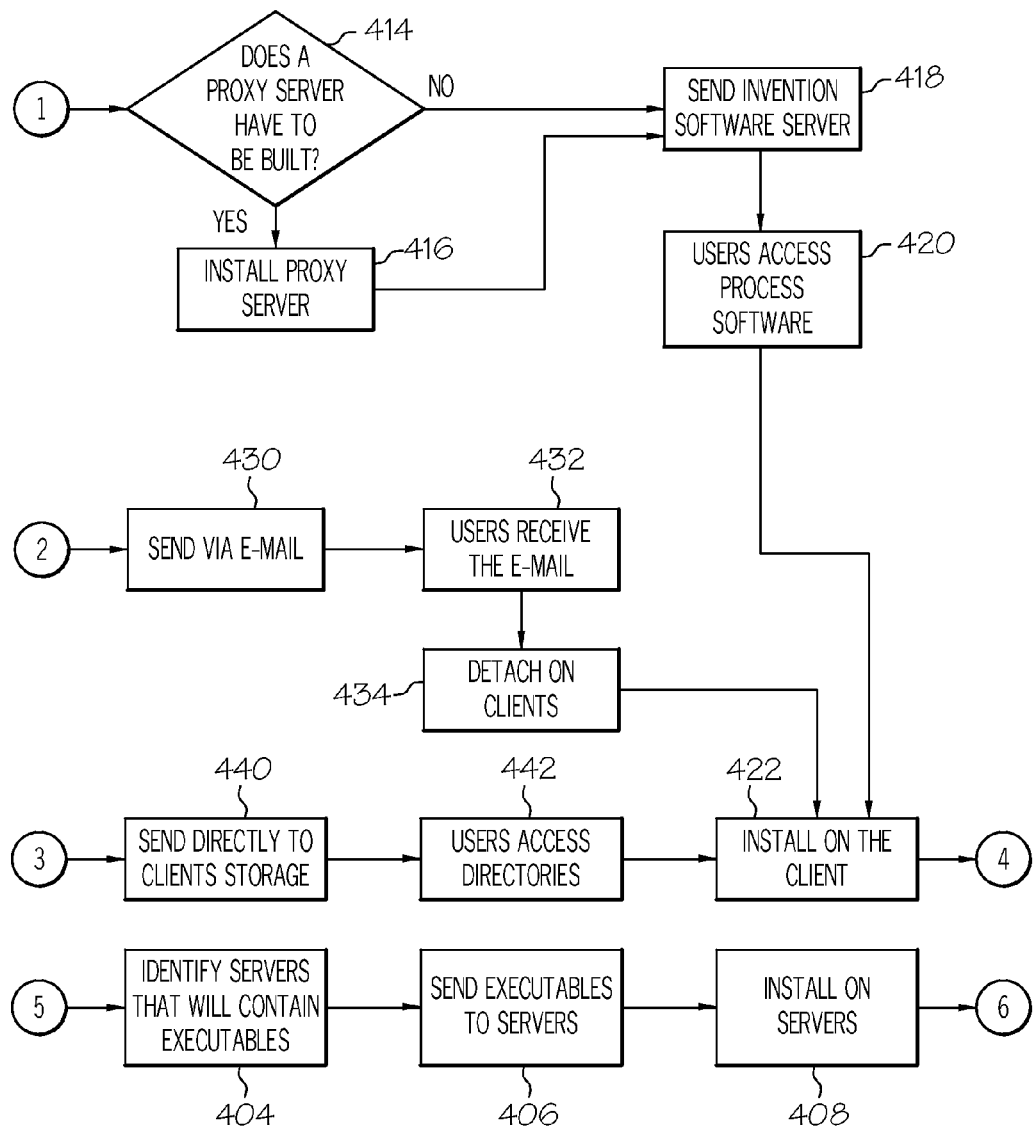

Referring then to FIGS. 4A-B, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
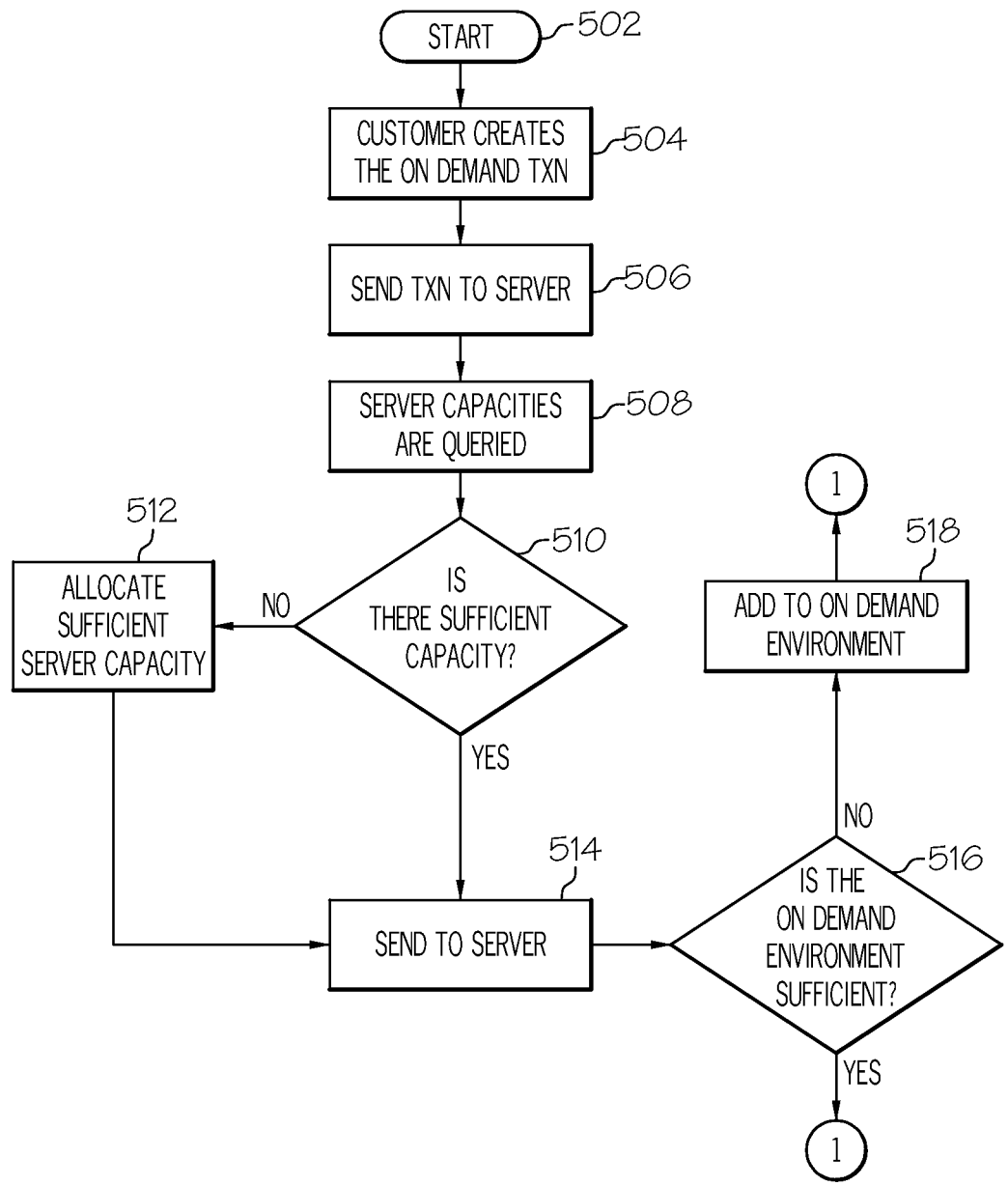
FIGS. 5A-B are flow-charts showing steps taken to execute the steps shown in FIGS. 1-2 using an on-demand service provider.
Figure 5B:
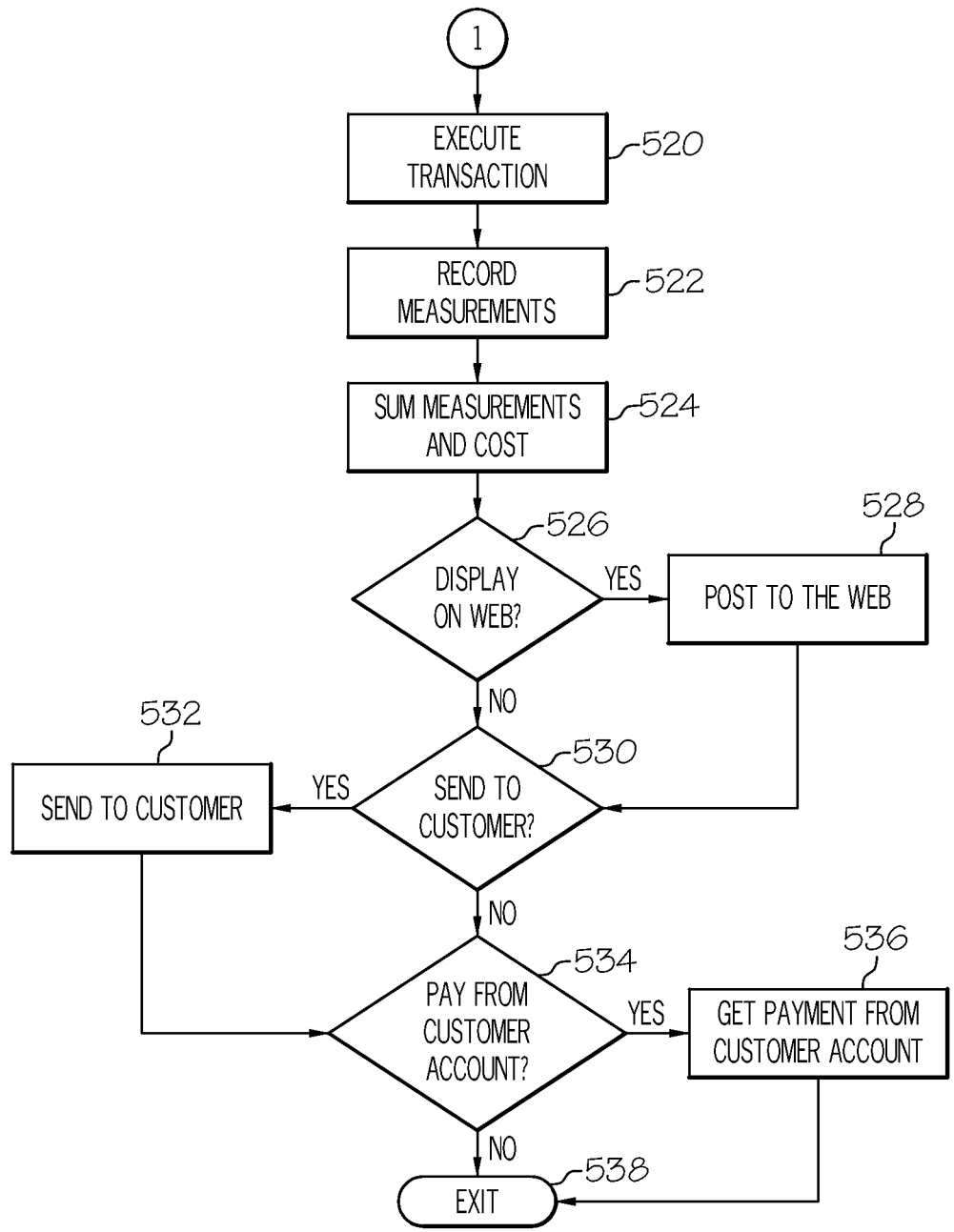

With reference now to FIGS. 5A-B, initiator block 502 begins the On Demand process. A transaction is created than contains the unique customer identification, the requested service type and any service parameters that further, specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the servers available CPU capacity in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient available CPU capacity then the transaction is sent to a selected server (block 514).

Before executing the transaction, a check is made of the remaining On Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

As described herein, the present invention provides a method, system, and computer-readable medium for synchronizing databases between two disparate computer systems. In one embodiment, the method includes the steps of: loading a buffer, which is part of a first computer system, with a database update, wherein loading the buffer does not initially commit the database update to a first database in the first computer system; calling a remote function, in the first computer system, to incorporate the database update into a second database that is part of a second computer system, wherein the first and second computer systems operate in disparate environments; in response to the remote function determining that the second database has been successfully updated with the database update, committing the database update to the first database in the first computer system; and in response to the remote function determining that the second database has not been successfully updated with the database update, rolling back the database update in the buffer such that the first database in the first computer system is unaware of an attempted updating of the first database. In one embodiment, the remote function is positioned after a plurality of database updates in a database table update queue in the first computer system, and wherein the remote function is not called until all of the database updates are successfully implemented in the buffer. Thus, committing the database update allows the first computer system to utilize the database update. The disparate environments of the first and second computer systems may be caused by different hardware architectures in the first and second computer systems. Alternatively, the disparate environments of the first and second computer systems are caused by the first computer system operating under a first software system and the second computer system operating under a second software system. If the disparate environments are software-based, the first software system may be initially designed by a software manufacturer such that the first software system is unable to confirm that the second software system has updated the second database. In one embodiment, the first software system is a SAP™ software system, and the second software system is a non-SAP™ software system.

While the present invention has been particularly shown and described with reference to a preferred embodiment, it will be understood by those skilled in the art that various changes in form and detail may be made therein without departing from the spirit and scope of the invention. For example, while the method described herein is related to synchronizing tables, any type of data structure may be synchronized in accordance with the present disclosure. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for synchronizing databases between disparate data processing environments, the method comprising:
   loading a buffer, which is part of a first data processing environment having a first database, with a plurality of database updates, wherein loading the buffer does not commit the plurality of database updates to the first database in the first data processing environment;
   calling one or more remote functions, in the first data processing environment, to apply one or more of the plurality of database updates to a second database that is part of a disparate second data processing environment, wherein the one or more remote functions are called only after all of the plurality of database updates are successfully loaded into the buffer;
   in response to the remote function determining that the second database has been successfully updated with the one or more of the plurality of database updates, committing the one or more of the plurality of database updates to the first database in the first data processing environment; and
   in response to the remote function determining that the second database has not been successfully updated with the one or more of the plurality of database updates, rolling back the one or more of the plurality of database updates in the buffer such that the first data processing environment is unaware of any attempted updates to the first database.

2. The method of claim 1, wherein the disparate first and second data processing environments respectively comprise first and second computer systems having different hardware architectures.

3. The method of claim 1, wherein the disparate first and second data processing environments respectively comprise disparate first and second software systems running on at least one hardware computer system.

4. The method of claim 3, wherein the first software system, as designed, is unable to confirm that the second software system has updated the second database.

5. The method of claim 3, and further comprising:
   the one or more remote functions applying the one or more of the plurality of database updates to the second database via middleware providing an interface between the first and second software systems.

6. A system comprising:
   a processor; and
   data storage coupled to the processor, the data storage including program code executable by the processor and configured to synchronize databases between disparate data processing environments by:
   loading a buffer, which is part of a first data processing environment having a first database, with a plurality of database updates, wherein loading the buffer does not commit the plurality of database updates to the first database in the first data processing environment;
   calling one or more remote functions, in the first data processing environment, to apply one or more of the plurality of database updates to a second database that is part of a disparate second data processing environment, wherein the one or more remote functions are called only after all of the plurality of database updates are successfully loaded into the buffer;
   in response to the remote function determining that the second database has been successfully updated with the one or more of the plurality of database updates, committing the one or more of the plurality of database updates to the first database in the first data processing environment; and
   in response to the remote function determining that the second database has not been successfully updated with the one or more of the plurality of database updates, rolling back the one or more of the plurality of database updates in the buffer such that the first data processing environment is unaware of any attempted updates to the first database.

7. The system of claim 6, wherein the disparate first and second data processing environments respectively comprise first and second computer systems having different hardware architectures.

8. The system of claim 6, wherein the disparate first and second data processing environments respectively comprise disparate first and second software systems running on at least one hardware computer system.

9. The system of claim 8, wherein the first software system, as designed, is unable to confirm that the second software system has updated the second database.

10. The system of claim 8, wherein the program code is further configured to synchronize databases between disparate data processing environments by causing the one or more remote functions to apply the one or more of the plurality of database updates to the second database via middleware providing an interface between the first and second software systems.

11. A program product, comprising:
a non-transitory computer-readable storage medium; and
program code stored on the non-transitory computer-readable storage medium and configured to synchronize databases between disparate data processing environments by:
loading a buffer, which is part of a first data processing environment having a first database, with a plurality of database updates, wherein loading the buffer does not commit the plurality of database updates to the first database in the first data processing environment;
calling one or more remote functions, in the first data processing environment, to apply one or more of the plurality of database updates to a second database that is part of a disparate second data processing environment, wherein the one or more remote functions are called only after all of the plurality of database updates are successfully loaded into the buffer;
in response to the remote function determining that the second database has been successfully updated with the one or more of the plurality of database updates, committing the one or more of the plurality of database updates to the first database in the first data processing environment; and
in response to the remote function determining that the second database has not been successfully updated with the one or more of the plurality of database updates, rolling back the one or more of the plurality of database updates in the buffer such that the first data processing environment is unaware of any attempted updates to the first database.

12. The program product of claim 11, wherein the disparate first and second data processing environments respectively comprise first and second computer systems having different hardware architectures.

13. The program product of claim 11, wherein the disparate first and second data processing environments respectively comprise disparate first and second software systems running on at least one hardware computer system.

14. The program product of claim 13, wherein the first software system, as designed, is unable to confirm that the second software system has updated the second database.

15. The program product of claim 13, wherein the program code is further configured to synchronize databases between disparate data processing environments by causing the one or more remote functions to apply the one or more of the plurality of database updates to the second database via middleware providing an interface between the first and second software systems.

16. The program product of claim 11, wherein the non-transitory computer-readable storage medium is a component of a remote server, and wherein the program code is deployable to a client computer from the remote server.

17. The program product of claim 11, wherein the program code is provided by a service provider to a customer on an on-demand basis.

* * * * *